United States Patent
Nakamura

(10) Patent No.: US 10,525,374 B2
(45) Date of Patent: Jan. 7, 2020

(54) METHOD FOR SEPARATING TRITIATED WATER FROM LIGHT WATER CONTAMINATED BY THE TRITIATED WATER

(71) Applicant: GLOBAL CLEAN TECHNOLOGY INC., Tokyo (JP)

(72) Inventor: Satoshi Nakamura, Tokyo (JP)

(73) Assignee: GLOBAL CLEAN TECHNOLOGY INC., Tokyo (JP)

( * ) Notice: Subject to any disclaimer, the term of this patent is extended or adjusted under 35 U.S.C. 154(b) by 183 days.

(21) Appl. No.: 15/322,558

(22) PCT Filed: Jul. 1, 2015

(86) PCT No.: PCT/JP2015/069057
§ 371 (c)(1),
(2) Date: Dec. 28, 2016

(87) PCT Pub. No.: WO2016/002856
PCT Pub. Date: Jan. 7, 2016

(65) Prior Publication Data
US 2017/0165590 A1    Jun. 15, 2017

(30) Foreign Application Priority Data
Jul. 1, 2014   (JP) .............................. 2014-135968

(51) Int. Cl.
*B01D 59/08* (2006.01)
*G21F 9/06* (2006.01)
(Continued)

(52) U.S. Cl.
CPC ............ *B01D 9/005* (2013.01); *B01D 59/08* (2013.01); *C02F 1/5236* (2013.01); *C02F 1/54* (2013.01);
(Continued)

(58) Field of Classification Search
None
See application file for complete search history.

(56) References Cited

U.S. PATENT DOCUMENTS

2005/0279129 A1* 12/2005 Muchnik ............... B01D 59/08
62/532

FOREIGN PATENT DOCUMENTS

| JP | 2002-006045 A | 1/2002 |
| JP | 2005-139015 A | 6/2005 |
| JP | 2013-226549 A | 11/2013 |

OTHER PUBLICATIONS

International Search Report issued for corresponding PCT/JP2015/069057 application.
(Continued)

*Primary Examiner* — Bradley R Spies
(74) *Attorney, Agent, or Firm* — IP Business Solutions, LLC

(57) ABSTRACT

Provided is an industrially feasible method for separating tritiated water from contaminated water. The method for separating tritiated water from light water contaminated by the tritiated water, includes the steps of; adding heavy water to the contaminated water; converting the liquid mixture of the contaminated water and the heavy water into a mixture of the light water and a gas hydrate consisting essentially of the tritiated water and the heavy water as the crystal structure under a condition of converting into the gas hydrate of at least one of the heavy water and the tritiated water, and yet keeping most of the light water in liquid state; and separating the gas hydrate from the light water.

11 Claims, 2 Drawing Sheets

(51) Int. Cl.
    *C02F 101/00*     (2006.01)
    *C02F 101/10*     (2006.01)
    *B01D 9/00*     (2006.01)
    *C02F 1/52*     (2006.01)
    *C02F 1/54*     (2006.01)

(52) U.S. Cl.
    CPC ........ *G21F 9/06* (2013.01); *C02F 2001/5218* (2013.01); *C02F 2101/006* (2013.01); *C02F 2101/10* (2013.01)

(56) References Cited

OTHER PUBLICATIONS

Susumu Saito, "Gas-Hydrate Process", Bulletin of the Society of Sea Water Science, Japan, vol. 22, No. 1 (1968) pp. 114-124.

Toshio Nishimoto et al., "Concentration of Sea Water and Brine by the Gas-Hydrate Process (XVII)" Dehydration and Washing of the Hydrate Crystal (Part 1).

Office Action for the counterpart Japanese Patent Application No. 2016-531429 dated Aug. 6, 2019.

\* cited by examiner

[Fig. 1]
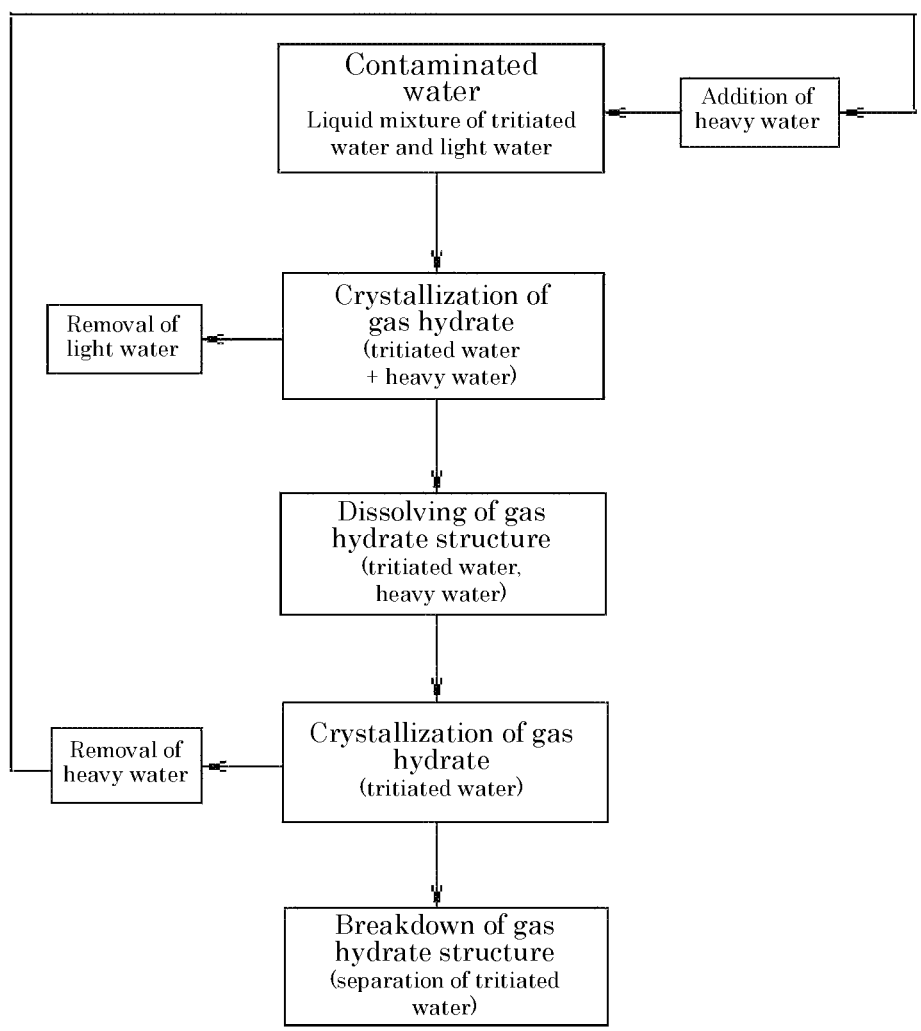

[Fig. 2]
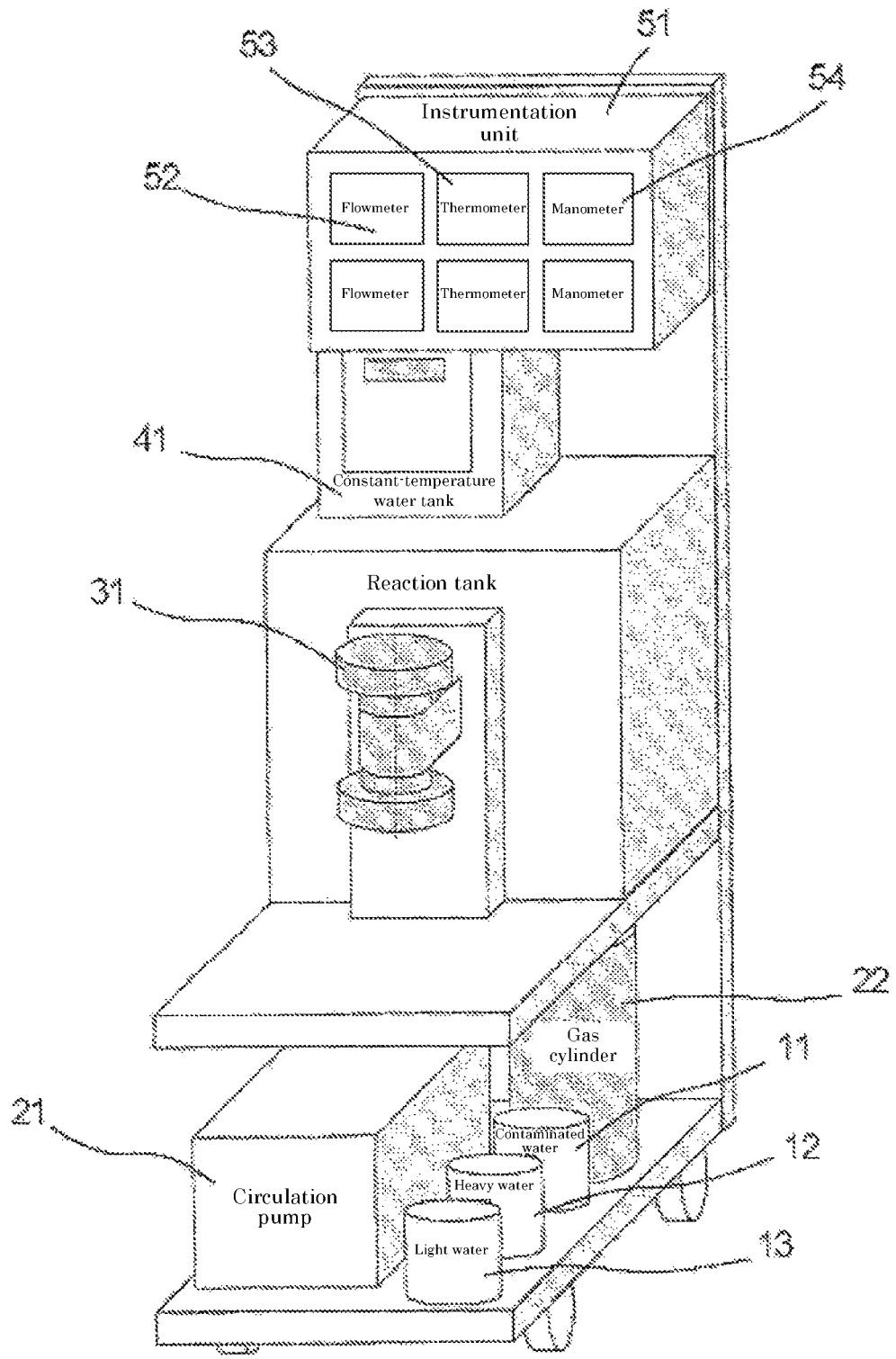

METHOD FOR SEPARATING TRITIATED WATER FROM LIGHT WATER CONTAMINATED BY THE TRITIATED WATER

TECHNICAL FIELD

The present invention relates to a method for separating tritiated water from light water contaminated by the tritiated water. Light water contaminated by the tritiated water is often hereinafter referred to as "the contaminated water".

BACKGROUND ART

Most of radioactive nuclear species in the contaminated water stored in Fukushima Daiichi Nuclear Power Plant of Tokyo Electric Power Company are removed by ALPS treatment and coprecipitation with iron compounds. But it is only tritium, which is present as tritiated water (HTO), for the radioactive nuclear species to remain in the contaminated water at a higher than the regulated concentration when the contaminated water would be released into public water area.

The tritium concentration in the contaminated water is 0.6 to $5 \times 10^6$ Bq/L and the volume of the contaminated water is increasing by 400 m$^3$/day every day. Thus, there is a need for development of a tritium-removing technology that can reduce the tritium concentration in the contaminated water at least to the environmentally allowable release concentration of $6 \times 10^4$ Bq/L or less (tritium concentration in sea water is 1 to 3 Bq/L) and has a processing rate of more than 400 m$^3$/day.

Because the specific radioactivity of tritium (T) is $3.59 \times 10^{14}$ Bq/g, the concentration of tritiated water in the contaminated water is extremely low at 1.11 to $9.29 \times 10^{-8}$ g/L, but it is desired for approximately 99% or more of tritiated water to be removed.

An idea of separating heavy water from light water, utilizing the difference in the crystallization temperatures of the gas hydrates between heavy water and light water is already known (Patent Document 1). Even though tritiated water would be used instead of heavy water, however, the concentration of tritiated water is extremely low in the contaminated water as described above, and when the gas hydrate containing tritiated water but not containing light water, is desired to be crystallized, the concentration is too low to form critical nucleus even though its precursor may be formed, and therefore, it is thus impossible in practice to crystallize the tritiated water.

Although there are many proposals separating the gas hydrate from liquid phase by floating or sedimentation separation, utilizing the difference in their specific densities, for separation of liquid phase and gas hydrate crystal (Non-Patent Literatures 1 and 2), in the case of the separation of tritiated water from light water, it is not possible to separate them sufficiently only by gravity, because the difference in their specific densities is very small, although the separation efficiency may depend on the gas used and the type of the hydrate structure formed.

Although a centrifugal method may be used, it is not practical as it demands high-speed and long-term operation for the separation because of the small particle diameter of the gas hydrate crystal.

Under the circumstances above, there is currently no industrially feasible method of separating tritiated water from light water.

CITATION LIST

Patent Literature

[Patent Document 1] JP-A No. 2005-139015

Non-Patent Literature

[Non-Patent Document 1] Susumu Saito, "Gas hydrate method," Bulletin of the Society of Sea Water Science, Japan, Vol. 22, No. 1 (1968) pp. 114 to 124

[Non-Patent Document 2] Toshio Nishimoto, Toshio Hashimoto, and Nobuo Okabayashi, "Concentration of sea water and brine by gas hydrate method," No. 17, Scientific papers of Hofu Salt Experiment Station, Japan Monopoly Corporation, 22 (1969), pp. 71 to 78

SUMMARY OF THE INVENTION

Technical Problem

An object of the present invention is to provide an industrially feasible method for separating tritiated water from light water contaminated by the tritiated water.

Solution to Problem

The present invention relates to a method for separating tritiated water from light water, includes:
  a first stage of removing the tritiated water from the contaminated water, including the steps of:
    adding heavy water to the contaminated water;
    converting the liquid mixture of the contaminated water and the heavy water into a mixture of the light water and a gas hydrate consisting essentially of both the tritiated water and the heavy water as the crystal structure under a condition of converting both the heavy water and the tritiated water into the gas hydrate of at least one of the heavy water and the tritiated water, and yet keeping most of the light water in the liquid state; and
    separating the gas hydrate from the light water;
  a second stage of separating the tritiated water from the heavy water including the steps of:
    breaking the gas hydrate structure consisting essentially of the tritiated water and the heavy water, so as to get a liquid mixture containing the tritiated water and the heavy water;
    converting the liquid mixture into the heavy water and a gas hydrate consisting essentially of the tritiated water in the crystal structure under a condition of converting into the gas hydrate of the tritiated water and yet keeping the heavy water in the liquid condition;
    separating the gas hydrate from the heavy water; and
    breaking the gas hydrate structure of the tritiated water, so as to collecting tritiated water in that order.

In the method for separating tritiated water from the contaminated water according to the present invention, the liquid mixture containing both the tritiated water and the heavy water obtained by breaking the gas hydrate consisting essentially of both the tritiated water and the heavy water in the crystal structure may be recrystallized repeatedly and then, the liquid mixture containing the tritiated water and the heavy water may be converted into a gas hydrate of the tritiated water and yet keeping the heavy water in the liquid state.

Advantageous Effects of Invention

It is feasible according to the present invention to use heavy water repeatedly and separate industrially tritiated water from the contaminated water. Tritium separated from the contaminated water may be used in an ultra-small reactor developed by Lockheed Martin Corporation, which is said to generate energy approximately 10,000,000 times larger than that generated by the same amount of fossil fuel, using nuclear fusion reaction with heavy water.

BRIEF DESCRIPTION OF DRAWINGS

FIG. 1 is a flow chart showing a scheme of the method of the present invention.

FIG. 2 is a schematic view of an apparatus in an embodiment of the present invention.

DESCRIPTION OF EMBODIMENTS

<1. Method for Separating Tritiated Water from the Contaminated Water>

A method for separating tritiated water from the contaminated water according to the present invention is shown in FIG. 1.

First, heavy water is added to the contaminated water. Thus, tritiated water, light water, and heavy water are mixed.

The contaminated water, which may contain additionally components other than tritiated water and light water. Heavy water is at least one of $D_2O$ and DOH.

Because the gas hydrate of heavy water is similar to the gas hydrate of tritiated water in the structure, the amount of heavy water added to the contaminated water is an amount at which the gas hydrate of heavy water functions as a seed crystal and the gas hydrate of the tritiated water crystallizes out as a mixture of the gas hydrate of tritiated water and the gas hydrate of heavy water. For example, it is approximately $10^4$ times higher than the tritium concentration in the contaminated water. In this case, because the tritium concentration in the contaminated water is 1.11 to $9.29 \times 10^{-8}$ g/L, as described above, the amount of the added heavy water added is approximately 0.01 to 50 wt % of the contaminated water.

After addition of heavy water, tritiated water and heavy water in the contaminated water are converted into a gas hydrate under a condition where one or both of heavy water and tritiated water is converted into the gas hydrate, and yet light water remains in the liquid state.

The condition where at least one of heavy water and tritiated water is converted into the gas hydrate, varies according to a kind of a used guest molecule and also to a formed crystal structure of the gas hydrate. For example, in the case where the structure of the gas hydrate of heavy water includes types I and II, the condition is set to a temperature and a pressure between the quadruple point ($Q_1$) of the hydrate phase, ice phase, the water phase of heavy water and the gas phase of the guest molecule and the quadruple point ($Q_2$) of the hydrate phase, the water phase, the gas phase and the liquid phase of the guest molecule.

The guest molecule of the gas hydrate is not particularly limited and may be a commonly used molecule. Examples thereof include $CH_2F_2$ (HFC-32), Ar, Kr, $N_2$, $O_2$, Xe, $H_2S$, $CH_4$, $CO_2$, $C_2H_4$, $C_2H_6$, $C_3H_6$, $C_3H_8$, $C_4H_{10}$, Freon gases, tetrahydrofuran (THF), acetone, and the like.

In particular, $CH_2F_2$ (difluoromethane), a gas called HFC-32, that will be described below in Examples, is preferred. Propane is also preferred.

A significantly different point from popular methods converting into the gas hydrate is that, when the mixture is converted into the gas hydrate in a supercooled state lower than $Q_1$, as in popular conversion of gas hydrate, light water may also be crystallized in a process of a conversion of heavy water to gas hydrate, because the condition converting into the gas hydrate of heavy water is similar to that of light water. However, $Q_1$ of light water is 0° C. under atmospheric pressure, while that of heavy water is 3.82° C. The difference of approximately 4° C. makes it feasible to convert heavy water into the gas hydrate and yet to keep light water in the liquid state.

In order to reduce the number of the gas molecules except for the guest molecule, it is needed to remove gases contained in light water and heavy water, such as air, oxygen, and carbon dioxide gas before the conversion into the gas hydrate. The removal means is not particularly limited, but a vacuum pump is usually used. The guest molecule is then mixed with both light water and heavy water. The mixing means is not particularly limited, but a gas bubbling method is usually used. The mixture is then converted into the gas hydrate after these treatments. Then, HFC-32 used as the guest molecule, which is more soluble in water, can accelerate the gas hydrate conversion.

However, if the mixture is converted into the gas hydrate in the supercooled state lower than $Q_1$, as an usual process of the gas hydrate conversion, also light water is converted into the gas hydrate. Therefore, a process as described below is used. When the pressure of the gas is increased, while the temperature is kept in the temperature range in which light water is not solidified, a point of time, at least one of heavy water and tritiated water is or are crystallized, at least one of heavy water and tritiated water begin(s) to be converted into the gas hydrate at one point of time, leading to drop of the gas pressure. Thus, a method of increasing the gas pressure is employed, so that the gas can be replenished. It is needless to say that the temperature is to be controlled in the range between $Q_1$ and $Q_2$ because heat is generated during the conversion into the gas hydrate.

The gas hydrate thus obtained, which includes a case where the gas hydrate is obtained under a condition of converting into the gas hydrate of heavy water, contains a solid converted into the gas hydrate of both tritiated water and heavy water. In that case, the crystal structure of the gas hydrate consists essentially of tritiated water and heavy water, and including additionally a small amount of light water into the gas hydrate crystal, but can be separated easily from light water that is mostly present in the liquid state simply by a known solid-liquid separation means such as filtration or centrifugation. Similarly, when tritiated water is converted into the gas hydrate first, also heavy water is converted into the gas hydrate. In the case of the contaminated water, the crystal structure of the gas hydrate thus crystallized contains the crystal-structured tritiated water in an amount of approximately 0.01 wt % with respect to the crystal-structured heavy water. Although the gas hydrate crystal is separated from a large volume of light water, it still contains the light water included in the crystal.

Then, the crystal structure of the gas hydrate consisting essentially of both tritiated water and heavy water is broken. It can be caused by shifting at least one of the temperature and the pressure in the crystal of the gas hydrate from the condition of the converting into the gas hydrate to the direction weakening the bonding force of the hydrate. Specifically, the gas hydrate crystal is melted under at least one of heat and reduced pressure. It is feasible in this way to separate both tritiated water, heavy water and small amount of light water from a large volume of light water. As a result, a liquid mixture containing heavy water and tritiated water and, additionally a small amount of light water is obtained.

The small amount of light water contained in the gas hydrate may be left, as it is, but may preferably be decreased. Recrystallization is preferred as such a method. The method utilizes two facts: one fact is that when a process is repeated of recrystallizing a liquid mixture containing both tritiated water and heavy water obtained by breaking the gas hydrate consisting essentially of both tritiated water and heavy water in the crystal structure, the gas hydrates grown to a certain size are left without destruction, but those in a size smaller than it are broken and recrystallized in the process. The other fact is that light water, which is hardly crystallized, remains in the liquid state, but yet both tritiated water and heavy water, which are easily crystallized, are converted into the gas hydrate. The condition converting into the gas hydrate during the recrystallization may be a supercooled state colder than the condition converting into the gas hydrate between $Q_1$ and $Q_2$. Details will be described below.

The liquid mixture including tritiated water and heavy water thus obtained is converted into the gas hydrate under a condition of converting tritiated water into the gas hydrate but yet leaving heavy water in the liquid state. The basic concept of this gas hydrate conversion process is the same as the phase transformation of the gas hydrate described above. $Q_1$ of heavy water is 3.82° C., while $Q_1$ of tritiated water is 4.49° C. under atmospheric pressure. Although the difference is not large, it is possible to promote conversion of tritiated water into the gas hydrate, and yet keep heavy water in the liquid state, if the temperature is controlled adequately. In this way, tritiated water can also be separated from heavy water. The heavy water can be used repeatedly.

<2. Apparatus for Separating Tritiated Water from the Contaminated Water>

A known apparatus is used as the apparatus for the crystallization of the gas hydrate of both heavy water and tritiated water or of tritiated water according to the method of the present invention. For example, used is an apparatus is used having a reaction tank for crystallization, a circulation pipe placed outside the reaction tank, and connecting the top to the bottom of the reaction tank, and a pump placed in the intermediate region of the pipe, feeding the contents of the reaction tank upward from the bottom to the top. A temperature in the pipe is not particularly limited, if it is higher than the crystallization temperature, but it is usually set to a temperature slightly higher than that of the reaction tank. The crystals of the gas hydrate in the reaction tank are trapped when they grow to a size larger than the filter pore size, and crystals smaller than the filter pore size return to the reaction tank, as they are melted during the circulation in the pipe and are recrystallized therein. The gas hydrate crystals in the reaction tank keep growing by the mechanism. After the crystals have grown to a certain size, the circulation of the liquid phase is hindered and a differential pressure of the pump increases. It is feasible to separate the hydrate crystals from the liquid phase by removing the liquid phase in the reaction tank at this stage.

An example of the separation apparatus used in the present invention is shown in FIG. 2.

It has a contaminated water tank 11 containing the contaminated water to be treated, a heavy water tank 12 and a light water tank 13. Although not shown in the Figure, a vacuum pump is connected to each of the contaminated water tank 11 and the heavy water tank 12 for removal of dissolved gases. The heavy water tank 12 contains heavy water to be added to the contaminated water, but may be used for storage of the heavy water recovered by the separation method of the present invention. The light water tank 13 is a tank for storage of light water separated and recovered from the contaminated water by the separation method of the present invention.

The circulation pump 21 is a pump for circulation of the contaminated water or heavy water to the reaction tank 31, and the gas cylinder 22 is filled with a substance for converting for the gas hydrate, such as propane gas.

The reaction tank 31 is an apparatus for converting heavy water and tritiated water into the gas hydrates of both the heavy water and tritiated water or for converting tritiated water into the gas hydrate of tritiated water.

The thermostatic water tank 41 is an apparatus that stores the contaminated water supplied from the contaminated water tank 11 by the circulation pump 21 and heavy water supplied from the heavy water tank 12 by the circulation pump 21, and regulates the temperature of these waters under a condition of converting into the gas hydrate by the instrumentation unit 51.

The instrumentation unit 51 has a flow meter 52, a thermometer 53, and a pressure control unit 54 adjusting the pressure from the gas cylinder 22 to a pressure converting into the gas hydrate.

The reaction tank 31 receives both the contaminated water and heavy water, controlled at a temperature converting into the gas hydrate with the thermostat of the water tank 41 and supplied by the circulation pump 21. Also, the reaction tank 31 receives the gas from the gas cylinder 22 after it is pressurized to a condition converting into a gas hydrate by the instrumentation unit 51. Both the contaminated water and heavy water are mixed by bubbling in the reaction tank 31, and so converting into a gas hydrate.

Although not shown in the figure, the circulation pipe for connecting the reaction tank 31 to the circulation pump 21, contains a filter and, as described above, the gas hydrate crystals grown to a size larger than the filter pore size in the reaction tank 31 are trapped, while the crystals smaller than the filter pore size are melted during circulation in the pipe, return back to the reaction tank 31, and are recrystallized therein. When the gas hydrate crystals in the reaction tank 31 grow to such a size that circulation of the liquid phase is hindered by the mechanism, the differential pressure of the pump increases. When the liquid phase in the reaction tank is removed in this stage, the hydrate crystal and the liquid phase are separated from each other.

Example 1

A commercially available reagent of tritiated water was mixed with ultrapure water to a tritium concentration of $5 \times 10^5$ Bq/L, to give a test sample water. After the sample water was placed in the reaction tank, the same amount of heavy water was added thereto. The sample water containing the added heavy water was deaerated under a reduced pressure by a vacuum pump. The operation was carried out at 19.0° C.

And furthermore, this is to be mentioned. The equipment was used the above-mentioned equipment.

HFC-32 gas was supplied into the reaction tank at a constant rate, while temperature of the reaction tank was held at 19.0° C. HFC-32 gas was dissolved into the water until the saturation and then a rate of pressure rise increased as soon as the saturation was reached. Just as the pressure increased and reached a condition of converting into the gas hydrate, gas hydrate crystals separated out. As the gas was consumed for conversion into the gas hydrate, so the pressure decreased rapidly. Therefore, HFC-32 gas was introduced, as needed, into the tank for compensation of the pressure drop. The water separated as the hydrate under this temperature/pressure condition, includes light water, heavy water, and tritiated water. Their gas hydrate having low degree of crystallinity was dissolved, passing through the external circulation unit in the way that the temperature of the water passing through the external circulation unit was heated to a temperature sufficiently higher than the $Q_2$ temperature (20.0° C.) of light water.

The temperature in the reaction tank was also raised gradually from 19.0° C. The temperature was raised to 22.5° C. at which light water gave a hydrate in an unstable phase, while both heavy water and tritiated water gave hydrates in a stable phase.

The reaction was continued under this condition and the liquid phase in the reaction tank was discharged when the flow rate of the external circulation unit decreased. The discharged liquid phase was degassed, as it was heated under a reduced pressure. The degassed liquid sample consisted essentially of light water after above-mentioned treatment. The concentration of tritiated water contained therein was determined. The measurement was performed by liquid scintillation method. Results are shown in "after first-stage separation" of Table 1.

The hydrate crystals remaining in the reaction tank was melted while degassed, by heating under a reduced pressure. The degassed liquid sample, was a mixture of both heavy water and tritiated water being concentrated. Instead of the operation described above, the hydrate crystals remaining in the reaction tank was liquefied under a reduced pressure and placed in another reaction tank as the sample water for use in operation of separation heavy water from tritiated water.

HFC-32 gas was fed into the reaction tank at a constant rate, while the temperature of the reaction tank was held at 19.0° C. HFC-32 gas was dissolved into the water until saturation and then rate of the pressure rise was increased as soon as saturation was reached. When the pressure reached the condition of converting into the gas hydrate, the crystals of the gas hydrate separated out. As the pressure decreased rapidly when the gas was consumed for converting into the gas hydrate, HFC-32 gas was introduced, as needed, into the tank for compensation of the pressure drop.

It was redissolved, that gas hydrate having low degree of crystallinity, passing through the external circulation unit, by setting the temperature of it heated to a temperature sufficiently higher than the $Q_2$ temperature (approximately 23° C.) of heavy water.

The temperature in the reaction tank also, was raised gradually from 19.0° C. The temperature was raised to 24° C. at which heavy water gave a hydrate in an unstable phase, while tritiated water gave a hydrate in a stable phase.

The reaction was continued under the condition and the liquid phase in the reaction tank was discharged when the flow rate of the external circulation unit decreased. The discharged liquid phase was degassed, as heated under a reduced pressure. The degassed liquid sample was heavy water.

The hydrate crystals remaining in the reaction tank was melted while degassed by heating under a reduced pressure. The degassed liquid sample was a mixture of heavy water and tritiated water and the concentration of tritiated water therein was determined. Results are shown at "after the operation concentrating tritiated water at the second-stage" in Table 1.

Example 2

A commercially available reagent of tritiated water was mixed with ultrapure water to a tritium concentration of 5×10$^5$ Bq/L, to give a test sample water. Used apparatus was the same as that of the example 1. After the sample water was placed in the reaction tank, the same amount of heavy water was added thereto. The sample water containing the added heavy water was deaerated under a reduced pressure by the vacuum pump. The operation was carried out at 19.0° C.

HFC-32 gas was supplied into the reaction tank at a constant rate, while the temperature of the reaction tank was held at 22.5° C. HFC-32 gas was dissolved into the water until saturation and the rate of the pressure rise increased as soon as saturation was reached. When the pressure increased and reached the condition of converting into the gas hydrate, the gas hydrate crystals separated out. Because the pressure decreased rapidly as soon as the gas was consumed for converting into the gas hydrate, HFC-32 gas was introduced, as needed, into the tank for compensation of the pressure drop. The gas hydrated water precipitated as the hydrate under the temperature/pressure condition, includes heavy water and tritiated water. Gas hydrates having low degree of crystallinity were redissolved, passing through a unit of the external circulation, in the way that the temperature of the water passing through the unit of the external circulation was heated to a temperature slightly higher than the $Q_2$ temperature (approximately 23° C.) of heavy water.

The temperature in the reaction tank was also raised gradually from 22.5° C. to 23.5° C. at which each of heavy water and tritiated water gave the hydrate in a stable phase while the hydrate of light water was melted crystallized as thermodynamically metastable phase. The reaction was continued under this condition and the liquid phase in the reaction tank was discharged when flow of in the unit of the external circulation decreased. The discharged liquid phase was degassed, as it was heated under a reduced pressure. The degassed liquid sample consists essentially of light water after above-mentioned treatment. The concentration of tritiated water contained therein was determined. The results are summarized in Table 1.

The hydrate crystals remaining in the reaction tank was melted while degassed by heating under a reduced pressure. The degassed liquid sample was a mixture of heavy water and tritiated water. The hydrate crystals remaining in the reaction tank was liquefied under a reduced pressure as sample water for the operation of the separation of heavy water from tritiated water.

HFC-32 gas was fed into the reaction tank at a constant rate, while the temperature of the reaction tank was held at 22.5° C. HFC-32 gas was dissolved into the water until the saturation and then a rate of the pressure rise was increased as soon as the saturation was reached. When the pressure reached the condition converting into the gas hydrate, crystals of the gas hydrate separated out. As the pressure decreased rapidly when the gas was consumed for conversion into the gas hydrate, HFC-32 gas was introduced, as needed, into the tank for compensation of the pressure drop.

The gas hydrate was dissolved having low degree of passing through the external circulation unit in the way that the temperature of the water passing through the external circulation unit was heated to a temperature slightly higher than the $Q_2$ temperature (approximately 23° C.) of heavy water.

The temperature in the reaction tank was also raised gradually from 19.0° C. to 24° C. at which heavy water gave a hydrate in the unstable phase while tritiated water gave a hydrate in the stable phase.

The reaction was continued under this condition and then the liquid phase in the reaction tank was discharged when the flow of the external circulation unit decreased to a value smaller than a predetermined value. The discharged liquid phase was degassed, as it was heated under a reduced pressure. The degassed liquid sample was heavy water after above-mentioned treatment.

The hydrate crystals remaining in the reaction tank was melted while degassed by heating under a reduced pressure. The degassed liquid sample being a mixture of heavy water and tritiated water, and the concentration of the tritiated water therein was determined. The results are summarized in Table 1.

The tritium concentrations in the liquids after the first stage separation of the gas hydrate crystals from the liquid, and of concentrated tritiated water in the reacting tank of the second stage

|  |  | Concentration of Tritiated water (Bq/L) |
|---|---|---|
| Example 1 | After the first-stage separation | $1.4 \times 10^3$ |
|  | After the operation concentrating tritiated water at the second-stage | $1.4 \times 10^8$ |
| Example 2 | After the first-stage separation | $1.3 \times 10^3$ |
|  | After the operation concentrating tritiated water at the second-stage | $1.6 \times 10^8$ |

REFERENCE SIGNS LIST

11: Contaminated water tank
12: Heavy water tank
13: Light water tank
21: Circulation pump
22: Gas cylinder
31: Reaction tank
41: Thermostatic water tank
51: Instrumentation unit
52: Flow meter
53: Thermometer
54: Pressure control unit

The invention claimed is:

1. A method for separating tritiated water from light water contaminated by the tritiated water, the concentration of the tritiated water in the contaminated water being 1.11 to $9.29 \times 10^{-8}$ g/L, comprising:
a first stage of removing the tritiated water from the contaminated water, including the steps of:
adding heavy water to the contaminated water;
converting the liquid mixture of the contaminated water and the heavy water into a mixture of the light water of the liquid state and a gas hydrate, wherein:
the gas hydrate consists essentially of both the tritiated water and the heavy water, but mainly of the heavy water, and
the light water is mostly in the liquid state; and
separating the gas hydrate from the light water;
a second stage of separating the tritiated water from heavy water, including the steps of:
breaking the gas hydrate structure consisting essentially of the tritiated water and the heavy water, so as to get a liquid mixture containing the tritiated water and the heavy water;
converting the liquid mixture into the heavy water and a gas hydrate consisting essentially of the tritiated water in the crystal structure under a condition of converting into the gas hydrate of the tritiated water and yet keeping the heavy water in the liquid condition;
separating the gas hydrate from the heavy water; and
breaking the gas hydrate structure of the tritiated water, so as to collecting tritiated water in that order.

2. The method for separating the tritiated water from the contaminated water according to claim 1, wherein the liquid mixture containing both the tritiated water and the heavy water obtained by breaking the gas hydrate consisting essentially of both the tritiated water and the heavy water in the crystal structure is recrystallized repeatedly for removal or deduction of light water contained in the gas hydrate and then, the liquid mixture containing both the tritiated water, and the heavy water is converted into a gas hydrate of the tritiated water and yet keeping the heavy water in the liquid state.

3. A method for separating tritiated water from light water contaminated by the tritiated water, the concentration of the tritiated water in the contaminated water being 1.11 to $9.29 \times 10^{-8}$ g/L, comprising the steps of:
adding heavy water to the contaminated water;
converting the liquid mixture of the contaminated water and the heavy water into a mixture of the light water of the liquid state and a gas hydrate, wherein:
the gas hydrate consists essentially of both the tritiated water and the heavy water, but mainly of the heavy water, and
the light water is mostly in the liquid state; and
separating the gas hydrate from the light water.

4. The method for separating tritiated water from contaminated water according to claim 1, wherein the amount of the heavy water added is approximately 0.01 to 50 wt % of the contaminated water.

5. The method for separating tritiated water from light water contaminated by the tritiated water according to claim 3, wherein the amount of the heavy water added is approximately 0.01 to 50 wt % of the contaminated water.

6. The method for separating tritiated water from contaminated water according to claim 1, wherein:
a guest molecule is used in converting the liquid mixture of the contaminated water and the heavy water into a mixture of the light water of the liquid state and a gas hydrate, and
the guest molecule is selected from $CH_2F_2$ (HFC-32), Ar, Kr, $N_2$, $O_2$, Xe, $H_2S$, $CH_4$, $CO_2$, $C_2H_4$, $C_2H_6$, $C_3H_6$, $C_3H_8$, $C_4H_{10}$, Freon gases, tetrahydrofuran (THF), or acetone.

7. The method for separating tritiated water from light water contaminated by the tritiated water according to claim 3, wherein:
a guest molecule is used in converting the liquid mixture of the contaminated water and the heavy water into a mixture of the light water of the liquid state and a gas hydrate, and
the guest molecule is selected from $CH_2F_2$ (HFC-32), Ar, Kr, $N_2$, $O_2$, Xe, $H_2S$, $CH_4$, $CO_2$, $C_2H_4$, $C_2H_6$, $C_3H_6$, $C_3H_8$, $C_4H_{10}$, Freon gases, tetrahydrofuran (THF), or acetone.

8. The method for separating tritiated water from contaminated water according to claim 1, wherein the converting the liquid mixture of the contaminated water and the heavy water into a mixture of the light water of the liquid state and a gas hydrate is conducted at a temperature of 19.0° C. to 24.0° C.

9. The method for separating tritiated water from light water contaminated by the tritiated water according to claim 3, wherein the converting the liquid mixture of the contaminated water and the heavy water into a mixture of the light water of the liquid state and a gas hydrate is conducted at a temperature of 19.0° C. to 24.0° C.

10. The method for separating tritiated water from contaminated water according to claim 1, wherein the converting the liquid mixture of the contaminated water and the heavy water into a mixture of the light water of the liquid state and a gas hydrate comprises mixing the contaminated water and heavy water by bubbling in a reaction tank.

11. The method for separating tritiated water from light water contaminated by the tritiated water according to claim 3, wherein the converting the liquid mixture of the contaminated water and the heavy water into a mixture of the light water of the liquid state and a gas hydrate comprises mixing the contaminated water and heavy water by bubbling in a reaction tank.

\* \* \* \* \*